United States Patent
Chapman et al.

(10) Patent No.: US 6,931,835 B2
(45) Date of Patent: Aug. 23, 2005

(54) MULTIVARIANT SET POINT USING $N_1$ AND $N_2$ FOR ENGINE CONTROL

(75) Inventors: Gregory J. Chapman, Scottsdale, AZ (US); John J. Rushinsky, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 149 days.

(21) Appl. No.: 10/430,788

(22) Filed: May 5, 2003

(65) Prior Publication Data

US 2003/0192302 A1 Oct. 16, 2003

Related U.S. Application Data

(63) Continuation-in-part of application No. 10/027,575, filed on Dec. 19, 2001, now Pat. No. 6,688,097.

(51) Int. Cl.⁷ .............................. F02C 9/28; F02K 3/04
(52) U.S. Cl. ..................... 60/226.1; 60/39.281; 60/243
(58) Field of Search ........................... 60/39.281, 226.1, 60/243, 792

(56) References Cited

U.S. PATENT DOCUMENTS

| | | | |
|---|---|---|---|
| 3,639,076 A | 2/1972 | Rowen | |
| 3,854,287 A | * 12/1974 | Rembold | .................. 60/39.281 |
| 4,242,864 A | 1/1981 | Cornett et al. | |
| 4,296,601 A | 10/1981 | Martin | |
| 4,651,518 A | 3/1987 | McLaughlin et al. | |
| 4,912,642 A | 3/1990 | Larsen et al. | |
| 5,067,080 A | 11/1991 | Farman | |
| 5,107,674 A | 4/1992 | Wibbelsman et al. | |
| 5,224,340 A | 7/1993 | Snow | |
| 5,303,545 A | * 4/1994 | Larkin | ...................... 60/39.281 |
| 5,394,689 A | 3/1995 | D'Onofrio | |
| 5,761,895 A | 6/1998 | Chu et al. | |
| 6,000,215 A | 12/1999 | Roberts, Jr. | |

* cited by examiner

Primary Examiner—Louis J. Casaregola
(74) Attorney, Agent, or Firm—Robert Desmond, Esq.

(57) ABSTRACT

A method for selecting a setpoint for a turbofan engine having a fan speed and a core idle speed scheduling includes determining a weighting factor based upon a throttle lever position, the weighting factor being zero in an idle region and ranging from zero to one in a dead band region and applying the weighting factor to an output of a fan speed governor and to an output of a core speed governor to select the setpoint.

5 Claims, 3 Drawing Sheets

MULTIVARIANT SET POINT USING $N_1$ AND $N_2$ FOR ENGINE CONTROL

RELATED APPLICATIONS

This application is a continuation in part of application Ser. No. 10/027,575 filed on Dec. 19, 2001, now U.S. Pat. No. 6,688,097.

BACKGROUND OF THE INVENTION

This invention relates to a throttle control for an aircraft turbofan engine, and more particularly to a throttle control, which eliminates dead band in the throttle control.

Typically, two different power setting parameters are used to define the speed of operation of a turbofan engine. These are fan speed at high power setting and engine core speed at idle. Historically, the transition to fan speed from core speed causes a dead band or slippage in the throttle response. The dead band is different for each engine due to the variation in engine hardware and control sensors.

The disclosure in U.S. Pat. No. 4,296,601 seeks to address this problem by controlling to a combined engine speed parameter. The combined speed parameter is comprised of core speed and fan speed. The combined parameter is correlated with power lever or throttle position so as to control fuel flow to the engine at variant power level requirements.

As indicated, many turbofan engines with electronic engine controls use fan speed as the power setting parameter for high power operation. Climb and takeoff power settings are examples of high power operation. However, at idle the same engine may use core (also known as HP shaft) speed as the power setting parameter. Typically, an equivalent idle power set fan speed is estimated for the core idle speed. The idle fan speed and the climb power setting fan provide end points for the engine throttle.

There is variability in the engine control sensors and from one engine's hardware to the next. Consequently, the estimated speed for idle may only be representative of a small number of engines. When operating at the estimated fan speed for idle some engines may have a core speed higher than the power setting core speed. To ensure all engines obtain the power setting core speed, the power set fan speed for idle is lowered below the estimated value. The lowering of the power set fan speed will ensure the engine transitions on to the core speed idle governor. However, this approach to transition from fan speed to core speed power setting often causes dead bands in the engine throttle movement.

The size of the dead band will vary depending on the individual engine characteristics. Consequently, on multi-engine aircraft the throttle for each engine will likely have a different dead band and could change as engines are replaced as part of normal maintenance.

As can be seen, there is a need for an apparatus and method that utilizes a combination of core idle speed and fan speed as parameters to ration the fuel flow to the engine to effect a smooth and continuous transition from one to the other, rather than relying on but one parameter, such as engine fan speed, to eliminate dead bands in the throttle angle.

SUMMARY OF THE INVENTION

In accordance with the present invention, a turbofan engine control system and method for eliminating dead bands in the throttle control decreases and increases the fuel flow to the engine during transition from the scheduled core speed to the scheduled fan speed of the engine. The system and method of the present invention utilize a combination of core idle speed and fan speed as the parameters to ration the fuel flow to the engine to effect a smooth and continuous transition from one to the other, rather than relying on but one parameter, such as engine fan speed, to eliminate dead bands in the throttle angle.

In one aspect of the present invention a method for selecting a setpoint for a turbofan engine having a fan speed and a core idle speed scheduling includes determining a weighting factor based upon a throttle lever position; and applying the weighting factor to an output of a fan speed governor and to an output of a core speed governor to select the setpoint.

In another aspect of the invention, a method for selecting a setpoint for a turbofan engine having a fan speed and a core idle speed scheduling includes determining a weighting factor based upon a throttle lever position, the weighting factor being zero in an idle region and ranging from zero to one in a dead band region; and applying the weighting factor to an output of a fan speed governor and to an output of a core speed governor to select the setpoint.

In yet another aspect of the invention, a system for selecting a setpoint for a turbofan engine having a fan speed and a core idle speed scheduling includes a throttle lever; a fan speed governor; a core speed governor; and a control unit operable to determine a weighting factor based upon a throttle lever position and to apply the weighting factor to an output of a fan speed governor and to an output of a core speed governor to select the setpoint.

These and other features, aspects and advantages of the present invention will become better understood with reference to the following drawings, description and claims.

DETAILED DESCRIPTION OF THE INVENTION

The following detailed description is of the best currently contemplated modes of carrying out the present invention. The description is not to be taken in a limiting sense, but is made merely for the purpose of illustrating the general principles of the invention, since the scope of the invention is best defined by the appended claims.

Figure 1:
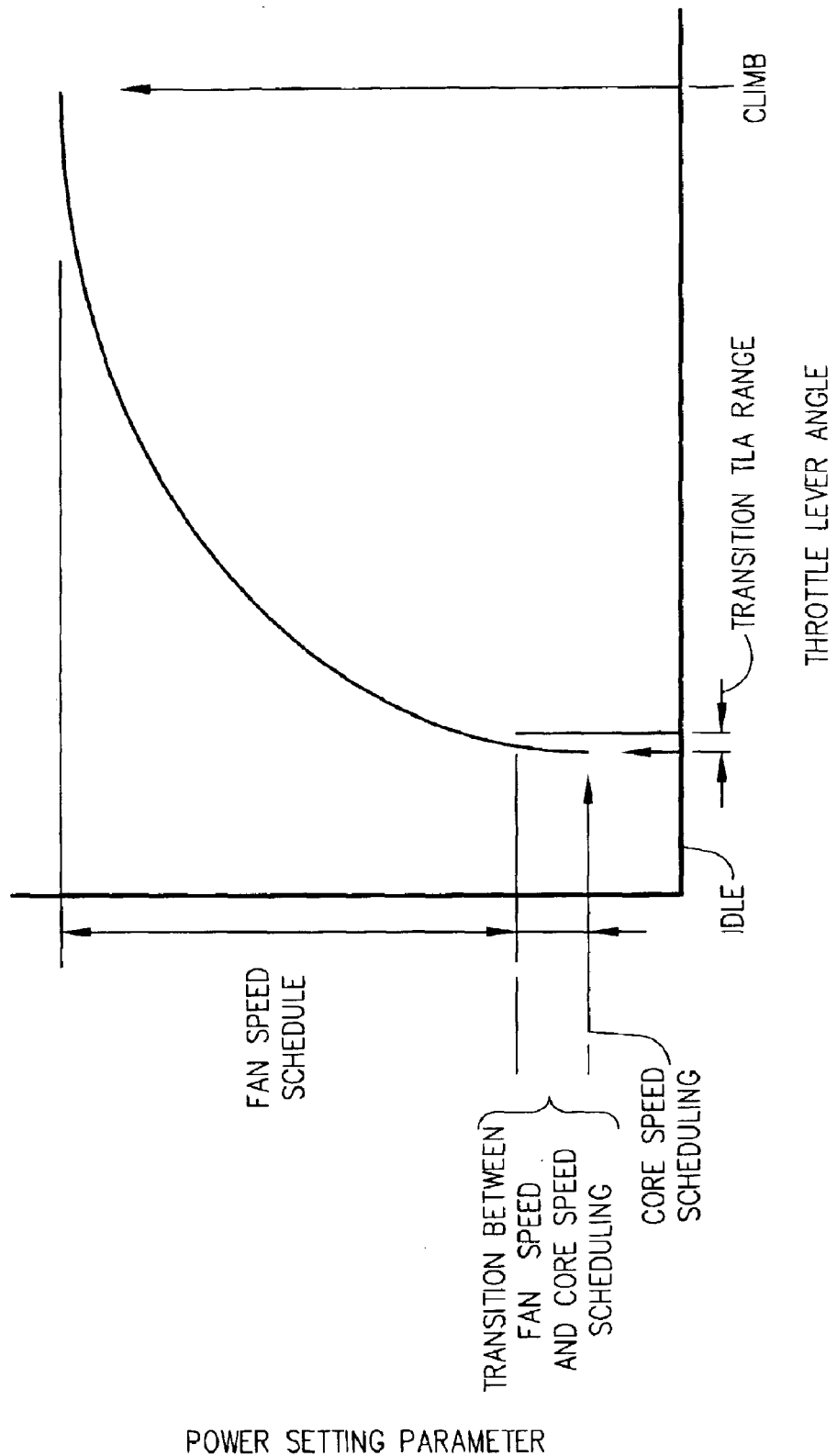
FIG. 1 is a graph of the desired power setting behavior correlated to throttle lever angle accomplished by the present invention.

Referring now to the drawings in detail, and particularly FIG. 1, the desired power setting behavior versus throttle lever angle (TLA) is depicted. For the majority of the throttle lever angle (TLA) range, the fan speed of the turbofan engine is the controlling parameter. At idle, the control parameter is the core speed of the turbofan engine. As indicated, there is to be a small region where a transition between fan speed and core speed control occurs; but all dead bands are eliminated by controlling fuel flow to the engine under the following protocol:

The change in fan speed for a fuel flow change is called the fuel flow gain for fan speed ($Kwf_{fan}$). The change in core speed for a fuel flow change is called the fuel flow gain for core speed ($Kwf_{core}$).

If the current fan speed is different from the desired (or power setting) fan speed, the required change is fuel is estimated by:

$$Wf_{new} - Wf_{old} = Kwf_{fan}(N_{fanschedule} - N_{fan}) \quad (1)$$

Likewise, if the current core speed is different from the desired (or power setting) core speed, the required change in fuel is estimated by:

$$Wf_{new} - Wf_{old} = Kwf_{core}(N_{coreschedule} - N_{core}) \quad (2)$$

where $Wf_{old}$ and $Wf_{new}$ are the old (or current) and new fuel flow rates, respectively. It is noted that in practice the requested change in fan speed is converted into an equivalent change in core speed which is then converted into a fuel flow change.

In the region of fan speed scheduling as depicted in FIG. 1, the engine fuel flow may be adjusted so that the engine fan speed equals the fan speed schedule:

$$N_{fan} = N_{fanschedule}$$

The transition from core speed scheduling to fan speed scheduling may be accomplished as follows:

$$N_{fan}K_{pla} + N_{core}(1-K_{pla}) = N_{fanschedule} * K_{pla} + N_{coreschedule} * (1-K_{pla}) \quad (3)$$

where $K_{pla}$ is 0 at idle TLA and increases to 1.0 at $$TLA = (\text{idle } TLA) + (\text{Transition } TLA \text{ Range}) \quad (4)$$

The more complete form of equation (3) is obtained using equation (1) and (2) above to give:

$$Wf_{new} = Wf_{old} + Kwf_{fan}(N_{fanschedule} - N_{fan})K_{pla} + Kwf_{core}(N_{coreschedule} - N_{core})(1-K_{pla}) \quad (5)$$

Equation 5 accounts for the dynamic effects of adjusting fuel flow with fan and core speed while achieving a smooth and continuous transition from fan speed to core speed scheduling.

Figure 2:
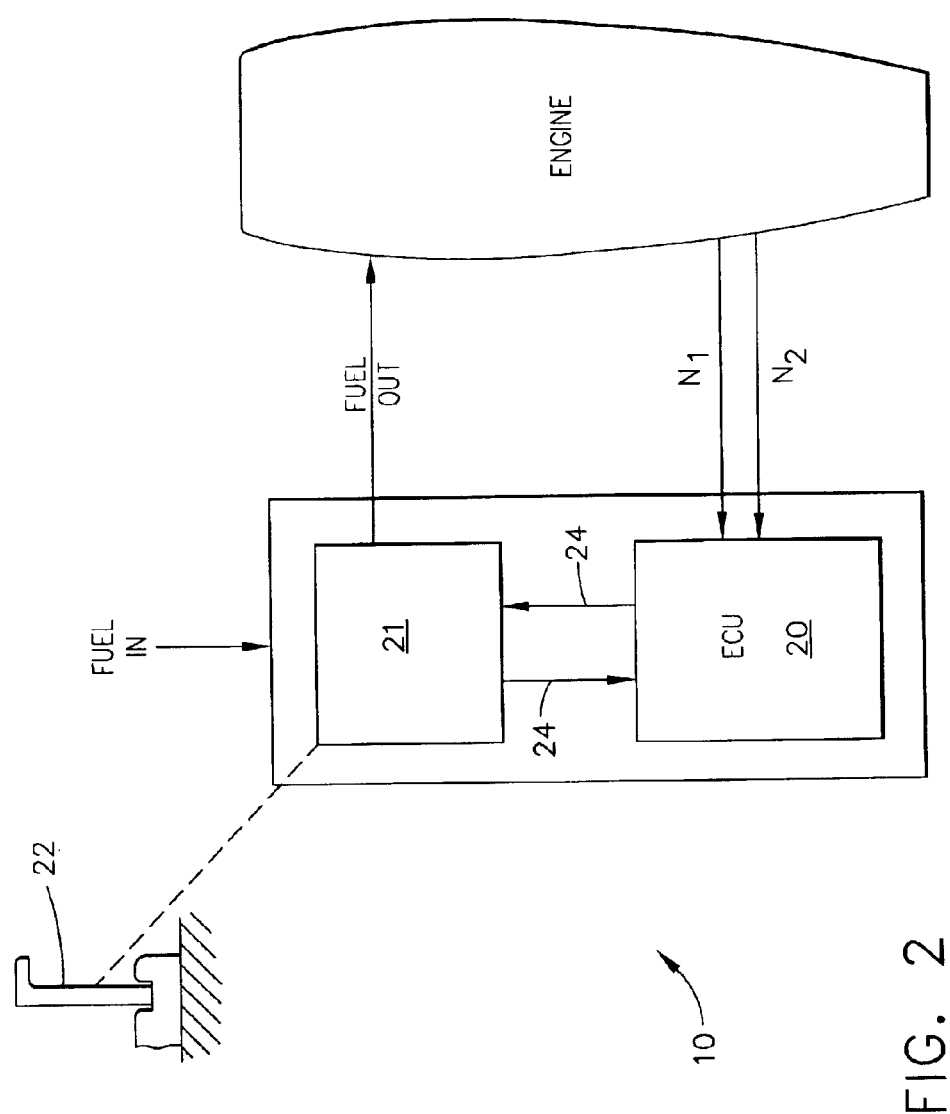
FIG. 2 is a schematic block diagram illustrating a system for implementing the present invention.

FIG. 2 shows a schematic block diagram of a fuel control system 10 for implementing the invention. This system includes an electronic computation unit (ECU) 20 which monitors the various engine operating parameters so as to control the operation of the fuel control to modify the fuel applied to the engine. The ECU 20 can modify flow in response to the engine parameters. Fuel can be supplied to a fuel pump, not shown. The fuel can flow through a line from the pump to a regulating valve assembly and then through another line to a power lever valve, which can be connected to the power throttle 22 (lines and valves are not shown), as they are well known to one of ordinary skill in the art. The power lever valve can be connected to a potentiometer which can be used to supply an electronic signal to the ECU 20. The signal can indicate the power lever position of the pump and regulating valve arrangement which are standard and not shown, but are indicated schematically at 21.

Included in the fuel control system 10 may be an electric torque motor (not shown) which may receive electrical signals from the ECU 20 over line 24. In response to these signals, the torque motor can open a flapper valve which is normally closed in the absence of a signal. As mentioned in an earlier portion of this description, the ECU and torque motor can provide an electrical interface to the hydromechanical fuel control to provide proper fuel ration units to the engine in relation to power lever movement. The ECU may be programmed to such parameters as $N_{core}$, $N_{fan}$, $N_{fanschedule}$, $N_{coreschedule}$, designated $N_1$, and $N_2$ in FIG. 2, and calculate the $Wf_{new}$ of the equation (5), until the correct ratio units are achieved for the engine at any operating condition. The ECU may accomplish this by applying a correction signal to the torque motor to modify the fuel flow produced by the hydromechanical portion in order to achieve the precise ratio units.

Figure 3:
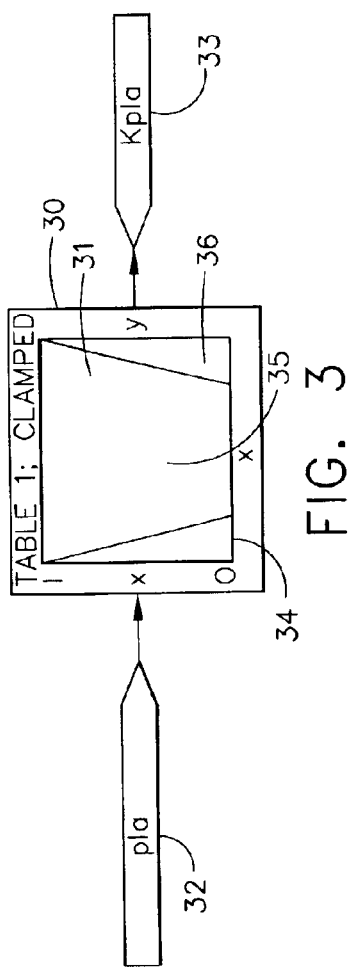
FIG. 3 is a schematic representation of a graph for use in determining a weighting factor in accordance with an aspect of the invention.

In another aspect of the invention and with reference to FIG. 3, there is shown an exemplary table 30 which may be programmed in the ECU 20. The table 30 may include a plurality of data points which correlate a throttle position angle 32 with Kpla 33. Table 30 may be advantageously programmed in the ECU 20 to provide for correlations between throttle position angle 32 and Kpla 33 which are not susceptible to expression as an equation. The table 30 is shown represented as a graph 31 having throttle position angle 32 (pla or power position angle) as an input and weighting factor Kpla 33 as the output. In a reverse thrust region 34, Kpla 33 decreases linearly from 1 to 0 as pla 32 approaches an idle region 35 where Kpla 33 is zero. In a forward thrust region 36, which may include the dead band, Kpla 33 increases linearly from 0 to 1.

Figure 4:
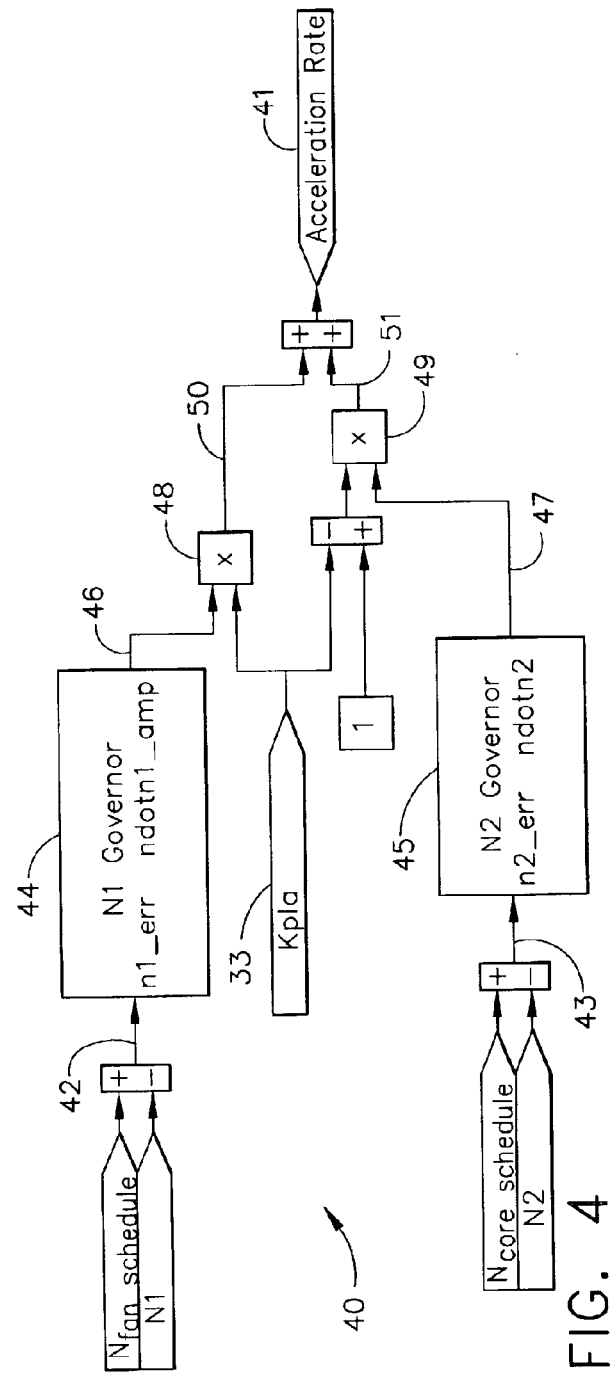
FIG. 4 is a flow diagram illustrating a process of the invention.

With reference to FIG. 4, there is illustrated a process generally designated 40 for determining an acceleration rate 41 for the core. Process 40 may be performed by ECU 20 (FIG. 2). Acceleration rate 41 may be converted by a governor (not shown) to fuel flow to the core. Error signal 42 (n1_err) may be generated as the difference between $N_{fanschedule}$ and N1. Error signal 43 (n2_err) may be generated as the difference between $N_{core}$ and N2. Error signal 42 may be input to a fan speed governor 44 and error signal 43 may be input to a core speed governor 45.

Fan speed governor 44 may generate an acceleration rate 46 (ndotn1_tmp) and core speed governor 45 may generate an acceleration rate 47 (ndotn2). Weighting factor Kpla 33 may be applied to the fan speed acceleration rate 46 and to the core speed acceleration rate 47 to determine a mixed mode setpoint (represented by acceleration rate 41) when Kpla 33 is between 0 and 1.

With continued reference to FIG. 4, Kpla 33 may be multiplied with the acceleration rate 46 at multiplier 48 to generate a weighted fan speed acceleration rate 50 and 1—Kpla 33 may be multiplied with the acceleration rate 47 at multiplier 49 to generate a weighted core speed acceleration rate 51. Weighted acceleration rates 50 and 51 may be summed to generate the acceleration rate 41.

By way of example, for the case where Kpla is 0 (in the idle region 35), the weighted fan speed acceleration rate 50 is zero resulting in acceleration rate 41 being determined entirely by the core speed acceleration rate 47. When Kpla is 1, the weighted core speed acceleration rate 51 is zero resulting in acceleration rate 41 being determined entirely by the fan speed acceleration rate 46. A mixed mode setpoint is achieved for values of Kpla between zero and 1.

As indicated, the present system disclosed can utilize a combination of core idle speed and fan speed as the parameters to ration the fuel flow to the engine to effect a smooth and continuous transition from one to the other, rather than relying on but one parameter, such as engine fan speed, to eliminate dead bands in the throttle angle.

It should be understood, of course, that the foregoing relates to preferred embodiments of the invention and that modifications may be made without departing from the spirit and scope of the invention. For example, the sign convention used in computing Kpla 33 may be reversed and the transition in Kpla 33 from zero to 1 may be nonlinear. Any such modifications should in no way limit the scope of the invention, which should only be determined based on the following claims.

We claim:

1. A system for selecting a setpoint for a turbofan engine having a fan speed and a core idle speed scheduling comprising:
   a throttle lever;
   a fan speed governor;
   a core speed governor; and
   a control unit operable to determine a weighting factor based upon a throttle lever position and to apply the weighting factor to an output of a fan speed governor and to an output of a core speed governor to select the setpoint.

2. The system of claim 1, wherein the weighting factor ranges in value from zero to one.

3. The system of claim 1, wherein the weighting factor is zero in an engine idle region.

4. The system of claim 1, wherein the weighting factor ranges from zero to one in a dead band region.

5. The system of claim 1, wherein the control unit is further operable to multiply the weighting factor to the output of the fan speed governor to generate a weighted fan speed acceleration rate, multiply one minus the weighting factor to the output of the core speed governor to generate a weighted core speed acceleration rate, and sum the weighted fan speed acceleration rate with the core speed acceleration rate to select the setpoint.

* * * * *